United States Patent
Agatsuma

[11] Patent Number: 6,141,471
[45] Date of Patent: Oct. 31, 2000

[54] OPTICAL TRANSMISSION MODULE AND ITS MANUFACTURING METHOD

[75] Inventor: Hiroyuki Agatsuma, Yokosuka, Japan

[73] Assignee: Kabushiki Kaisha Toshiba, Kawasaki, Japan

[21] Appl. No.: 09/156,676

[22] Filed: Sep. 18, 1998

[30] Foreign Application Priority Data

Sep. 18, 1997  [JP]  Japan ..................................... 9-253302
Mar. 13, 1998  [JP]  Japan .................................. 10-063626

[51] Int. Cl.⁷ ........................................................ G02B 6/36
[52] U.S. Cl. ................................ 385/49; 385/80; 385/83; 385/88; 385/92
[58] Field of Search .................................. 385/80, 83, 65, 385/49, 88, 89, 90, 91, 92, 93, 94

[56] References Cited

U.S. PATENT DOCUMENTS 5,416,868   5/1995   Kakii et al. ................................. 385/65
5,656,120   8/1997   Ota et al. .................................. 156/293
5,706,378   1/1998   Suzuki et al. .............................. 385/49
5,818,990  10/1998   Steijer et al. .............................. 385/49

FOREIGN PATENT DOCUMENTS 6-34845   2/1994   Japan .

*Primary Examiner*—Hung N. Ngo
*Attorney, Agent, or Firm*—Foley & Lardner

[57] ABSTRACT

In an optical transmission module, guide pins have formed thinned parts and/or pass-through parts, and fixing grooves formed in a base to receive the guide pins are shaped to satisfy predetermined conditions, so as to alleviate heat conduction from guide pins to an optical connector and to firmly fix the guide pins in the grooves with an adhesive without causing the extrusion of the adhesive. Thus, the optical connector can be brought into optical alignment with the optical transmission module without being excessively heated through the guide pins, and the production yield of the optical transmission module can be improved.

20 Claims, 10 Drawing Sheets

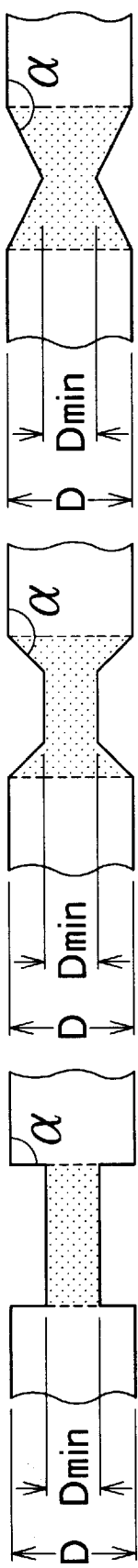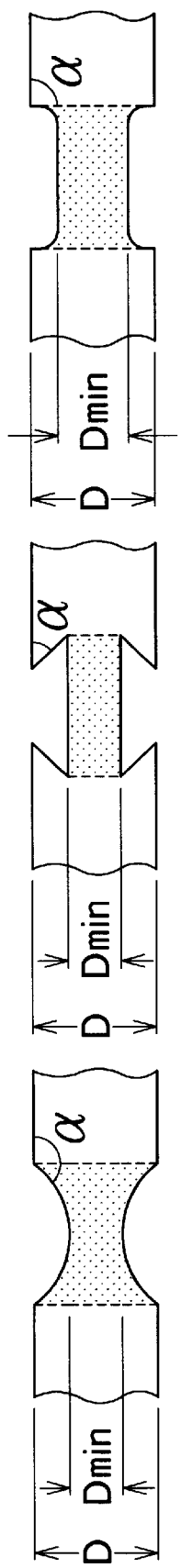

OPTICAL TRANSMISSION MODULE AND ITS MANUFACTURING METHOD

BACKGROUND OF THE INVENTION

This invention relates to an optical transmission module and its manufacturing method. More particularly, the invention relates to an optical transmission module and its manufacturing method facilitating reliable fixture of guide pins for an optical connector in the optical transmission module and improving the performance of the optical transmission module.

In the recent technical field of optical communication, there is a demand for techniques for transmitting a huge amount of data at a high speed in practical applications such as data transfer between LANs (local area networks) or between boards in a computer system. A typical transmission system used for data communication consists an optical transmitter module, an optical transmission medium and an optical receiver module. The optical transmitter module includes a laser diode, control IC and optical coupling elements for connection to an optical connector. The optical transmission medium includes the optical connectors having means for connection to respective modules and an optical fiber. The optical receiver module includes a photodiode, control IC and optical coupling elements for connection to the optical connector. In most cases, guide pins are used for connection between the optical connector and individual modules. In the present specification, the optical transmitter module and the optical receiver module, among these components, are collectively called "optical transmission modules", or sometimes simply "modules".

Optical transmission modules are desired to be compact, light, highly durable and low in power consumption. On the other hand, there is the need for development of modules including multi-channeled optical fibers, high-speed optical semiconductor element and control IC, aiming a greater amount of data and a higher data transfer rate. However, a further sophisticated structure is required to realize a module having a increased number of the transmission channel. That is, a simple and reliable structure must be proposed while keeping the heat dissipation high enough. A high productivity and a high production yield are also required in order to supply the module at a low price.

FIG. 14 is a schematic plan view of a central part of a optical transmission module made by the Inventor on an experimental basis in the process to accomplishment of the present invention. The optical transmission module includes an optical semiconductor element 102a and a signal processing IC 102b disposed on a base 101 with a predetermined configuration. The base 101 is a substrate made from a silicon wafer, for example. The optical semiconductor element 102a is a semiconductor element such as laser diode or photodiode. Located in front of the optical semiconductor element 102a is one end of an optical fiber 103 to input or output an optical signal. The optical fiber 103 is fixed by an optical fiber holder 104 as a reinforcement element. Connected to the other end of the optical fiber 103 is an optical connector, not shown, so that it can exchange optical signals with other optical transmission modules via optical fibers, not shown. In order to ensure optical coupling with the optical connector, not shown, guide pins 105, 105 are provided.

Although there is shown the case having only one optical fiber 103, discussion made here is applicable also to an element having a plurality of optical fibers 103 aligned in parallel and a plurality of laser diodes or photo diodes disposed in an array as optical semiconductor elements 102a. For such multi-channeled optical transmission modules, a rapid increase of demand is expected in applications such as inter-board connection.

The silicon base 101 has formed guide pin fixing grooves 101a. These grooves 101a have a V-shaped cross-sectional configuration which can be made by anisotropic wet etching utilizing a crystallographic anisotropy of silicon. The guide pins 105 are held in the guide pin fixing grooves 101a with their ends extended beyond the silicon base 101 for engagement with the optical connector, not shown, and are secured on the base 101 by an adhesive 106.

In order to ensure optical coupling of the optical fiber 103 of the module to an optical fiber of the optical connector, the base 101 and the optical connector must be brought into close contact.

However, close contact between the module and the optical connector invites a problem caused by heat generation of the element and a problem regarding its assembly. These problems are discussed below in greater detail.

The problem of heat generation of the element is discussed first.

In the optical transmission module shown in FIG. 14, heat generated from the optical semiconductor element 102a and IC 102b is released through a heat sink (not shown) in contact with the bottom plate of the base 101. That is, heat generated by these elements is externally released from the base 101 through a heat sink (not shown).

IC 102b typically has a circuit arrangement whose power consumption per one channel is 0.2 to 0.3W. Therefore, power consumption is within 0.8 to 1.2W in a structure for four channels, but is large as 2 to 3W in a structure for ten channels. According to experiments by the Inventor, in such modules, the temperature at one end 101c of the base 101 sometimes exceeded 70° C. during the operation, depending on the mode of heat dissipation and the ambient temperature. Since the maximum allowable temperature of the optical connector connected to the module was lower than 70° C. in most cases, the module often failed in normal data transfer due to an optical misalignment caused by heat from the module.

The Inventor made investigation on heat movement paths and found that heat conduction through guide pins 105 was large. That is, since the guide pins 105 are made of a metal with a high thermal conductivity, the optical connector is heated through them. Once the optical connector is heated, a thermal strain occurs, and the optical alignment of the optical connector deviates from the optical alignment of the module.

A multi-mode fiber has the core diameter of 50 $\mu$m giving a certain extent of allowance. A single mode fiber for single mode transmission, however, has the core diameter as small as approximately 10 $\mu$m, a smaller optical misalignment, as small as several $\mu$m, results in increasing the optical coupling loss, and disables stable data transfer.

On the other hand, for close contact between the module and the optical connector, there was also a problem on their assembly. That is, an end surface 101c of the base 101 had to be planar, and the adhesive had to be applied carefully not to overhang onto the end surface 101c.

If the adhesive 106, before setting, flows through gaps between guide pins 105 and the guide pin fixing grooves 101a by a capillary action onto the end surface 101c of the base 101, the optical connector cannot get into close contact with the optical module. To prevent the problem, it is necessary to make means for preventing extrusion of the adhesive. As one of such means, the Inventor experimentally made grooves 101e along the guide pin fixing grooves 101a to prevent the extrusion of the adhesive.

The extrusion preventing grooves 101e can be made by etching similarly to the guide pin fixing grooves 101a. However, an uniform stirring of an etchant is disturbed at the grooves 101e in the etching process. It results in changing the etching rate at the guide pin fixing grooves 101a from the etching rate at the remainder part and in difficulty to make guide pin fixing grooves 101a with a uniform configuration. Therefore, the use of the extrusion preventing grooves 101e involved the problem of a low production yield of the base 101.

On the other hand, it is technically difficult to first make the grooves 101a, then apply a photo resist onto the upper surface of the base 101 and slope surfaces of the grooves 101a, and make photo resist apertures to be used for etching the extrusion preventing grooves 101e by PEP (photo-engraving process). In other words, it is difficult to make guide pin fixing grooves 101a and overflow preventing grooves 101e separately by the anisotropic wet etching.

It would be also possible to make extrusion preventing grooves 101e by using a dicing machine after the guide pin fixing grooves 101a are made. However, chipping is liable to occur at corners where the extrusion preventing grooves 101e cross the guide pin fixing grooves 101a, and it is difficult to prevent the chipping. Here again, therefore, the problem of a low production yield of the base 101 remains.

It is necessary to make a metal thin film wiring pattern on the base 101 for electric connention of electronic elements including optical semiconductor elements. The surface of the metal thin film wiring pattern had better be clean for subsequent wire bonding or mounting of the electronic elements. For this purpose, the step for making the metal thin film wiring pattern had better be the final step in the manufacturing process of the base 101. The metal thin film wiring pattern is typically made by the so-called lift-off process. Namely, by applying a photo resist on the entire upper surface of the base 101, making a photo resist opening in a location for the metal thin film wring pattern by PEP, and stacking a metal thin film thereon by vapor deposition, for example. Thereafter, when the photo resist is removed by using an organic solvent, the metal thin film on the photo resist is also removed together, leaving the metal thin film wiring pattern of a predetermined configuration on the base 101.

However, grooves on the base 101 causes the photo resist applied thereon to be uneven in thickness. Particularly, the extrusion preventing grooves 101e additionally formed on the base make the irregularity of the base surface more complicated, and make the unevenness in thickness of the photo resist larger. Here again, the problem of a low production yield of the base remains.

For assembling such modules, there is often used the method configured to fix guide pins 105 in guide pin fixing grooves 101a with an adhesive 106 applied in gaps between the bottom surfaces of the guide pin fixing grooves 101a and the guide pins 105 placed therein. In this method, the adhesive 106 results in being applied under the guide pins 105 from one end of each guide pin 105 nearer to the optical semiconductor element. Usually, the adhesive is applied from a nozzle. In order to prevent overflow of the adhesive from the opening at the ends of the guide pins 105 nearer to the optical semiconductor element, injecting conditions of the adhesive, such as injecting pressure and injecting speed, must be determined appropriately. However, since these injecting conditions involves various factors including size and the position of the injecting nozzle, the viscosity of the adhesive, injecting pressure and injecting time, it is difficult to control the quantity of the supplied adhesive, which results in decreasing the production yield in terms of fixture of the guide pins.

SUMMARY OF THE INVENTION

It is therefore an object of the invention to provide an optical transmission module and its manufacturing method which alleviate heat conduction through guide pins not to heat an optical connector and to ensure optical coupling thereby, and attain an increase of the production yield and a decrease of the manufacturing cost.

According to the invention, there is provided an optical transmission module comprising:

a base;

an optical semiconductor element formed on said base;

an optical fiber provided on said base and having one end optically coupled to said optical semiconductor element and the other end extending toward an end of said base; and a guide pin placed in parallel with said optical fiber and having a portion extending beyond said base, said portion of the guide pin extending beyond the base being brought into engagement with a recess formed in an optical connector, said base having a fixing groove for receiving a part of said guide pin on its inner wall, said guide pin having formed at least one thinned part, a distance between said guide pin and said inner wall of said fixing groove being larger at said thinned part.

Alternatively, according to the invention, there is provided an optical transmission module comprising:

a base; an optical semiconductor element formed on the base; an optical fiber provided on the base and having one end optically coupled to the optical semiconductor element and the other end extending toward an end of the base; and a pair of guide pins placed in parallel at opposite sides of the optical fiber and each having a portion extending beyond the base, the portion of the guide pin extending beyond the base being brought into engagement with a recess formed in an optical connector, the base having a pair of fixing grooves each for receiving a part of each guide pin, each fixing groove having opposite side walls which make an inner angle $\theta$ not smaller than 40° and not larger than 100°, having a width W along the surface of the base which is larger than $D \cdot \cos(\theta/2)$, and having a depth X from the surface of the base to the bottom of the fixing groove which is larger than $(W/2) \cdot \cot(\theta/2) + (D/2) \cdot (1 - 1/\sin(\theta/2))$, each guide pin having formed at least one thinned part.

With these arrangements, heat conduction from the optical transmission module to the optical connector is restricted, and optical misalignment caused by heat is prevented. Additionally, the extrusion of the adhesive at the end surface of the base is prevented when the guide pins are fixed, and the production yield is improved accordingly.

According to the invention, there is further provided a method for manufacturing an optical transmission module including a base having a pair of fixing grooves; an optical semiconductor element formed on the base; an optical fiber provided on the base and having one end optically coupled to the optical semiconductor element and the other end extending to an end of the base; and a pair of guide pins placed in parallel at opposite sides of the optical fiber and each having a portion extending beyond the base, each guide pin having at least one thinned part, the portion of the guide pin extending beyond the base being brought into engagement with a recess formed in an optical connector, comprising the steps of: placing each guide pin in each fixing groove of the base together with a photo-setting adhesive; and irradiating light for curing the adhesive in a direction substantially parallel to the fixing grooves from one end of the base where one end of the fixing groove is exposed, and curing part of the adhesive which flows to bottoms of the fixing grooves.

This method can prevents extrusion of the adhesive by quickly hardening it before flowing onto the end surface of the base.

The invention is worked in the modes explained above, and attains the following effects.

The guide pins having thinned parts alleviate heat conduction from the optical transmission module to the optical connector, and prevent optical misalignment caused by heat. That is, although a large part of heat generated from the optical semiconductor element and IC is transferred to the guide pins, the thinned parts formed in the guide pins reduce heat conduction to the optical connector. Therefore, the optical connector is prevented from excessive heat and from optical misalignment caused by thermal strain.

Since heat conduction to the optical connector is alleviated, an optical communication system improved in durability and reliability against heat can be realized. For example, even in interiors of electronic devices where the ambient temperature is high, or under severe conditions such as deserts or space environment, the optical communication system is expected to diminish the optical misalignment of the coupling portion caused by an excessive increase of temperature and to operate with a high reliability.

Additionally, the invention permits the use of an optical connector with a lower resistance to heat than conventional ones while ensuring good transmission characteristics, and therefore makes it possible to provide an inexpensive optical communication system.

Furthermore, by processing the guide pins with thinned parts that can be made easily at a low cost, the invention removes the need for the extrusion preventing grooves in the guide pin fixing grooves, which was the factor of a low production yield of optical transmission modules. Therefore, the invention realizes cost reduction and mass productivity of optical transmission modules.

Moreover, the invention enables regulated application of the adhesive under the guide pins by making pass-through portions in the guide pins in addition to the thinned parts. Therefore, the invention realizes higher production yield, cost reduction and mass productivity of optical transmission modules.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 11A through 11F are fragmentary cross-sectional views showing various examples of a thinned part in a guide pin suitable for use in optical transmission modules according to the invention;

DETAILED DESCRIPTION OF THE PREFERRED EMBODIMENTS

Explained below are some embodiments of the invention with reference to the drawings.

Figure 1:
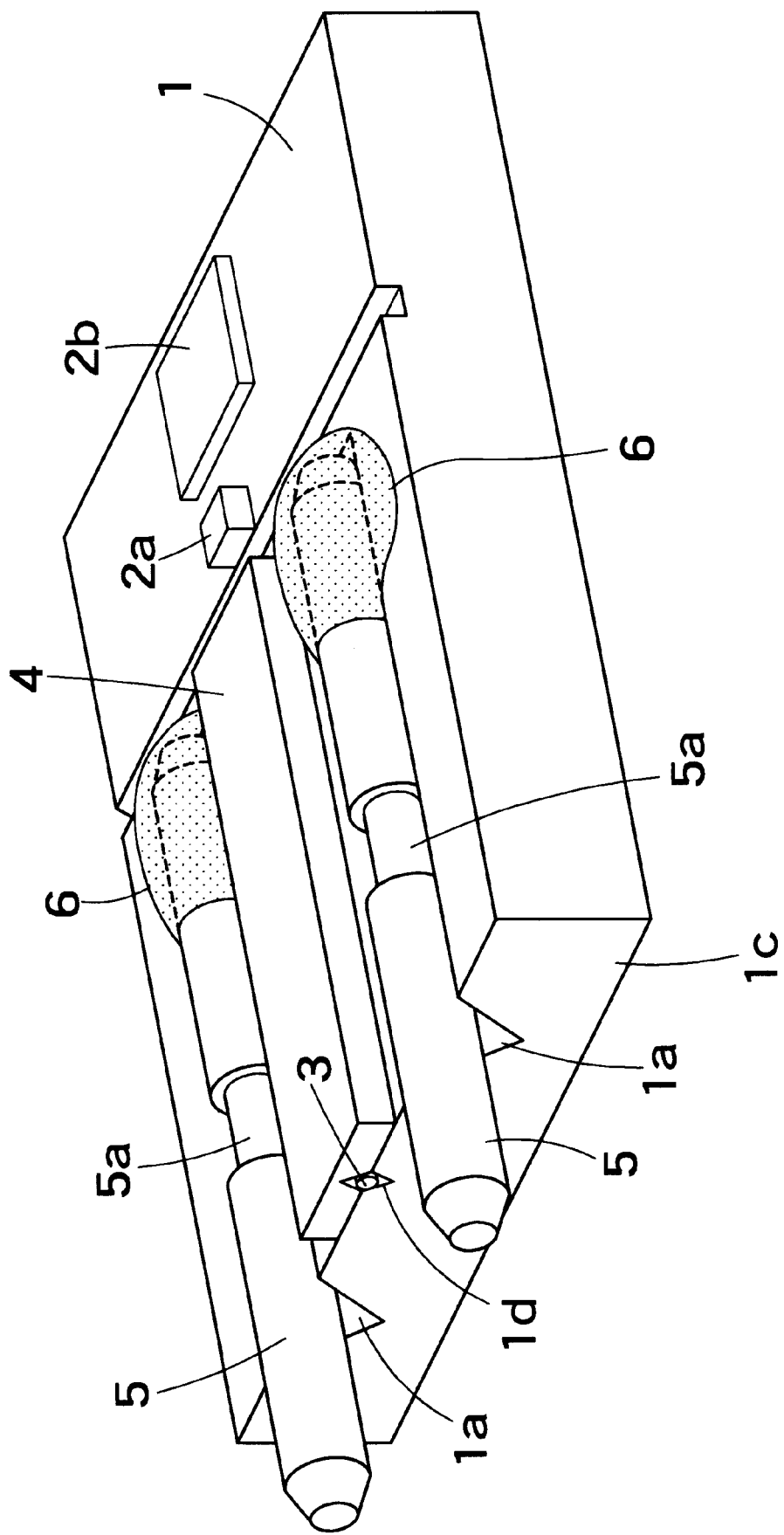
FIG. 1 is a perspective view of an optical transmission module according to the first embodiment of the invention, roughly showing its interior structure.

FIG. 1 is a perspective view roughly showing the central structure of an optical transmission module according to the first embodiment of the invention.

Figure 2:
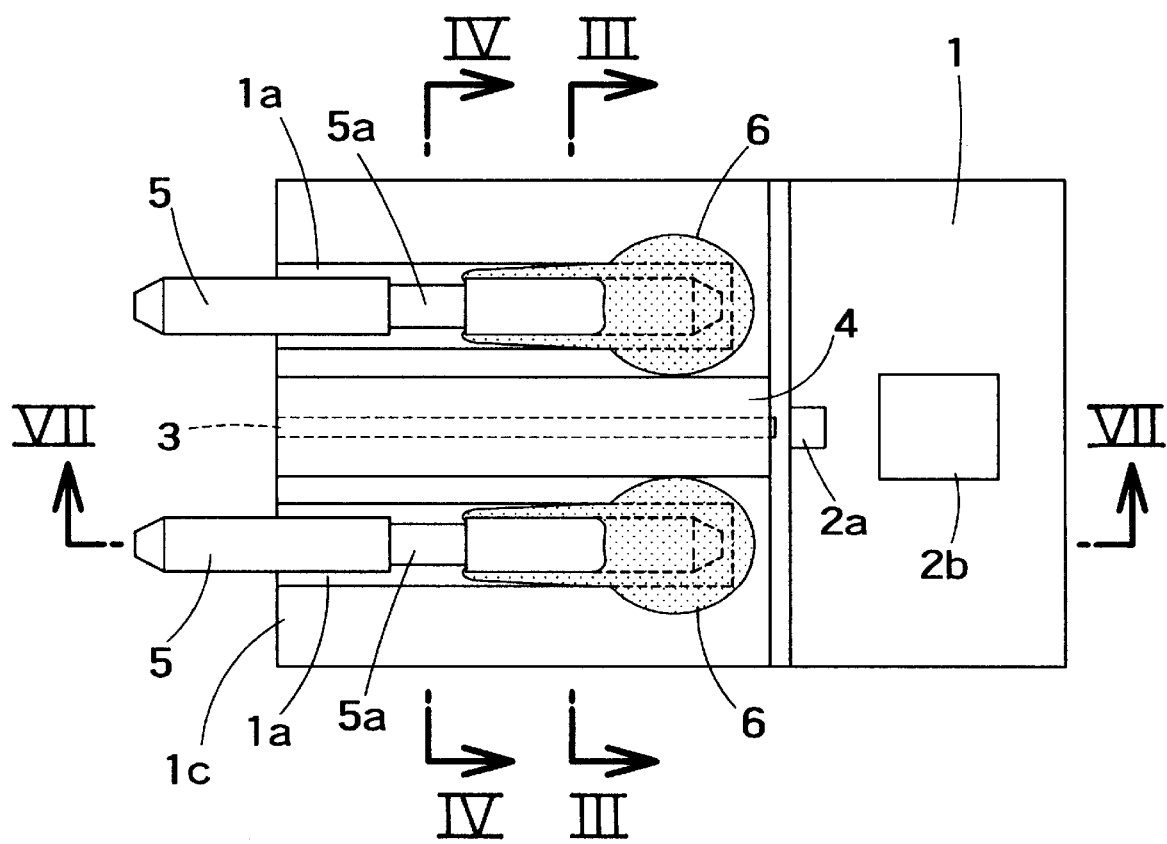
FIG. 2 is a plan view of the optical transmission module according to the first embodiment of the invention, roughly showing its interior structure viewed from the upper direction.

FIG. 2 is a plan view of the central structure of the same module, viewed from the upper direction.

One of important features of the optical transmission module shown here lies in a thinned part made in each guide pin. More specifically, an optical semiconductor element 2a and IC 2b are placed on an base 1. The optical semiconductor element 2a and IC 2b are electrically connected by a wiring path, not shown. Provided in front of the optical semiconductor element 2a is an optical fiber 3 for optical transmission between the optical semiconductor element 2a and an optical connector (not shown), optically coupled to the optical semiconductor element 2a. The optical fiber 3 is tightly held between an optical fiber fixing groove 1d formed in the base 1 and an optical fiber holder 4. Each guide pin 5 has formed a thinned part 5a, and it is fixed in a guide pin fixing groove 1a formed in the base 1 with an adhesive 6.

Configurations around the guide pins are explained below in greater detail, with reference to a cross-sectional view of FIG. 3 taken along the III—III line of FIG. 2 and another cross-sectional view of FIG. 4 taken along the IV—IV line of FIG. 2.

Figure 3:
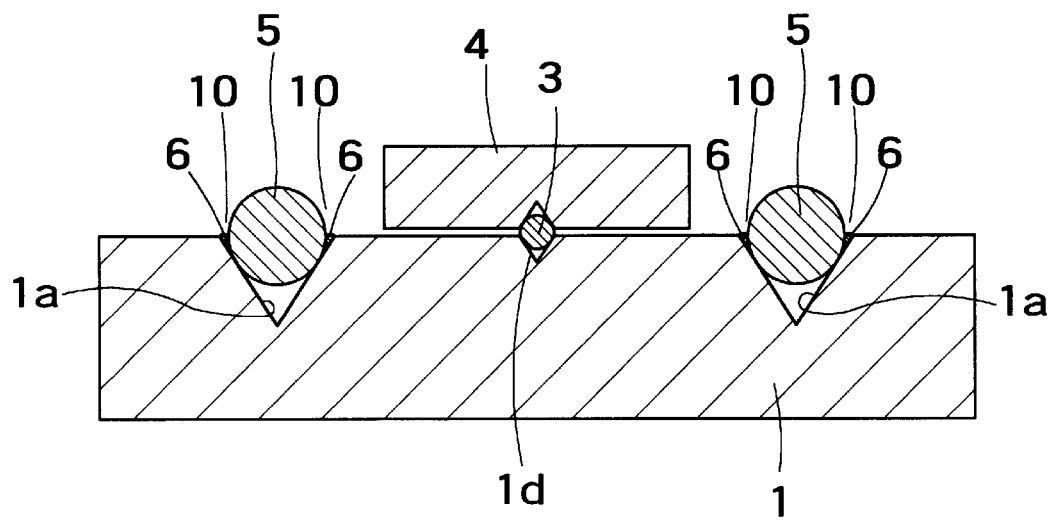
FIG. 3 is a cross-sectional view of the optical transmission module taken along the III—III line of FIG. 2.
Figure 4:
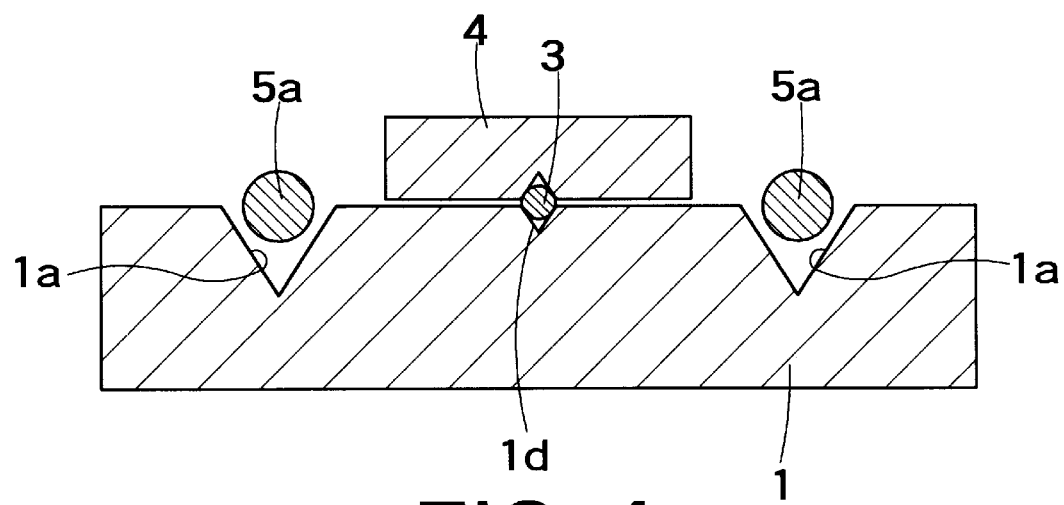
FIG. 4 is a cross-sectional view of the optical transmission module taken along the IV—IV line of FIG. 2.

As shown in FIGS. 3 and 4, each guide pin 5 is a right circular cylinder with a diameter D except for its opposite ends and the thinned part 5a. The cross-sectional shape of the thinned part 5a is a circle with a diameter D' (<D). The diameter of the thinned part 5a may be uniform throughout the entire length thereof. The guide pins 5 are supported with their portions having the diameter D by side wall surfaces of the fixing grooves 1a in the base, and the thinned parts 5a float from the side wall surfaces. The guide pins 5 may be made of a metal, for example. Each guide pin 5a can be made easily and economically by first processing opposite ends of a metal circular cylinder with the diameter D and subsequently gouging out a radially outer part thereof in the region for the thinned part 5a to the depth of the diameter D'.

Figure 5:
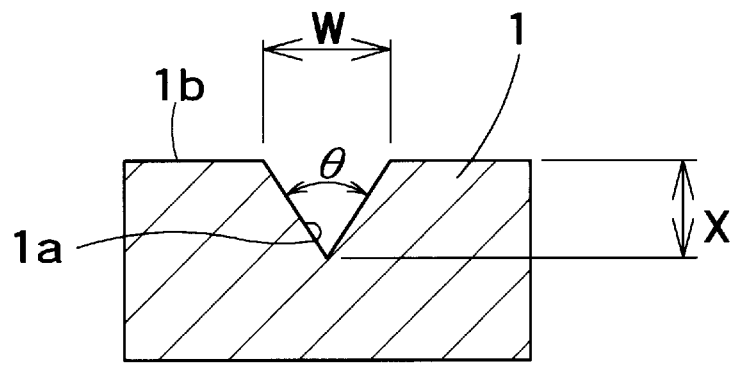
FIG. 5 is a fragmentary cross-sectional view showing a cross-sectional configuration of a guide pin fixing groove 1a formed in a base 1.

FIG. 5 is a cross-sectional view of an exemplary cross-sectional shape of the guide pin fixing groove 1a made in the base 1. The guide pin fixing groove 1a shown here is preferably made so that its opposite inner walls be slanted to make an angle θ in the range from 40° to 100°, more preferably, around 70°. In order for the guide pins 5 to be stably supported by the side walls of the fixing groove 1a, the width W of the fixing groove 1a along the upper surface 1b of the base 1 should be not less than D·cos(θ/2). The fixing groove 1a with a width satisfying this condition promises reliable support of the guide pin 5 therein.

Although it is immaterial if the fixing groove 1a has the V-shaped cross section shown in FIG. 5, when the fixing groove 1a has an inverted-frustum cross-sectional configuration having a flat bottom, the fixing groove 1a must be deep to prevent the guide pin 5 from contacting the bottom of fixing groove 1a. In order to prevent the guide pin 5 from contacting the bottom of the fixing groove 1a, it is important that the depth X of the fixing groove 1a is not smaller than $(W/2)\cdot\cot(\theta/2)+(D/2)\cdot(1-1/\sin(\theta/2))$.

In the optical transmission module, the optical fiber 3 is preferably located so that its center be on the line connecting centers of the guide pins 5, 5 in the cross-sectional views of FIGS. 3 and 4. Therefore, when the distance from the upper surface 1b of the base 1 to the center of the optical fiber 3 is L (the downward distance is positive) is L, θ, W and L must be determined to satisfy the equation $2L=W\cdot\cot(\theta/2)-D/\sin(\theta/2)$. The base 1 used here is a (100)-oriented silicon base. In the silicon base, the lengthwise direction of the guide pin fixing groove 1a aligns with the [011] direction.

Figure 6:
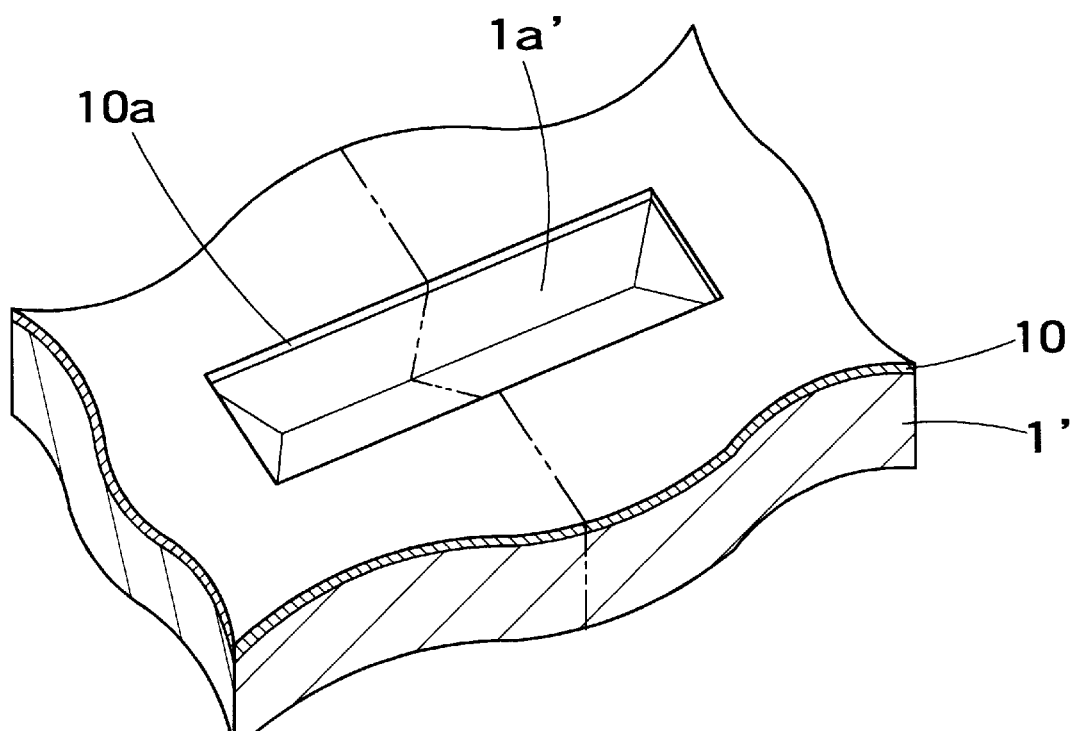
FIG. 6 is a fragmentary perspective view of the base 1 in the optical transmission module according to the first embodiment.

FIG. 6 is a fragmentary perspective view of the base 1 the optical transmission module according to the same embodiment under a manufacturing process. As shown here, a silicon oxide film 10 is formed on a silicon base 1' and selectively removed by PEP and wet etching to make a rectangular opening 10a extending in the [011] direction. Thereafter, using the silicon oxide film 10 as a mask, the base 1' is selectively removed in the opening 10a by wet etching using KOH solution to form the fixing groove 1a' defined by the {111}-oriented surfaces as shown in FIG. 6. After that, by cutting the base 1' along the double-dot chain line in FIG. 6, the base 1 having guide pin fixing groove 1a can be obtained.

The angle θ made by opposite side surfaces of the guide pin fixing groove 1a made in this manner is a value satisfying $\cos(\theta/2)=6^{1/2}/3$, approximately 70.5°. In this case, the width W of the guide pin fixing groove 1a along the upper surface 1b of the base 1 should be larger than $D\cdot\cos(\theta/2)=6^{1/2}\cdot D/3$. When the distance L from the upper surface 1b of the base 1 to the center of the optical fiber 3 is 0, the width W of the guide pin fixing groove 1a made by the process shown in FIG. 6 is $6^{1/2}\cdot D/2$ (this is bigger than $6^{1/2}\cdot D/3$) which satisfies the condition explained above.

According to the invention, the guide pins having thinned parts alleviate heat conduction from the optical transmission module to the optical connector, and prevent optical misalignment caused by heat. That is, although a large part of heat generated from the optical semiconductor element and IC is transferred to the guide pins, the thinned parts formed in the guide pins reduce heat conduction to the optical connector. As a result, the optical connector is prevented from being excessively heated and from optical misalignment caused by thermal strain.

Reduction in quantity of heat conduction by the invention depends on the cross-sectional area of the thinned part 5a. Within the extent maintaining the entire strength of the guide pin 5, the smaller the cross-sectional area of the thinned portion 5a, the less the quantity of heat conduction, and the more effectively suppressed the increase of the temperature of the optical connector.

Since heat conduction to the optical connector is alleviated in this manner, the invention makes it possible to realize an optical communication system improved in durability and reliability against heat. For example, even in interiors of electronic devices where the ambient temperature is high, or under severe conditions such as deserts or space environment, the optical communication system is expected to diminish the optical misalignment of the coupling portion caused by an excessive increase of temperature and to operate with a high reliability.

Additionally, the invention permits the use of an optical connector with a lower resistance to heat than conventional ones while ensuring good transmission characteristics, and therefore makes it possible to provide an inexpensive optical communication system.

Next explained is a process for manufacturing the optical transmission module shown above, and in particular, the bonding process therein.

Figure 7:
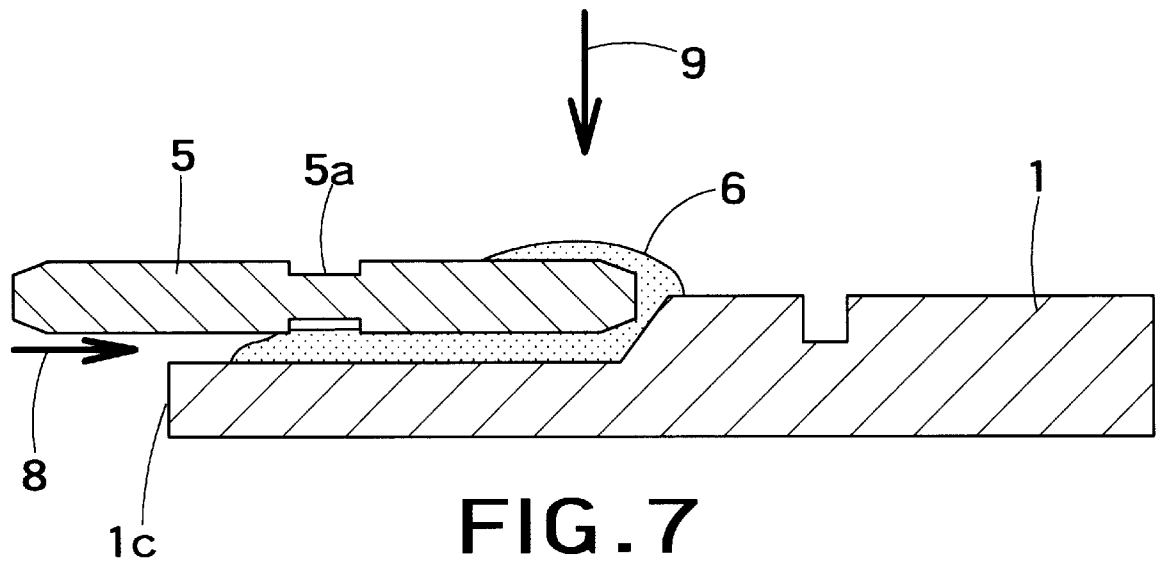
FIG. 7 is a cross-sectional view of the optical transmission module according to the first embodiment, illustrating the process of applying an adhesive.

FIG. 7 is a cross-sectional view of the optical transmission module according to the same embodiment under the process for applying the adhesive. The adhesive 6 used here is a photo-setting adhesive. For fixing the guide pins 5, the adhesive 6 is applied in a heaped-up configuration onto the rear half of each guide pin 5 from the thinned portion 5a nearer to the optical semiconductor element 2a as shown in FIG. 2. In this process, the adhesive 6 may be applied onto the part of the fixing groove 1a for contact with the guide pin 5 prior before putting the guide pin 5 therein, or may be applied onto the guide pin 5 after placing it in the fixing groove 1a.

After that, curing light 8 is irradiated onto the adhesive 6 under the guide pin fixing groove 1a from one end 1c of the base 1 as shown in FIG. 7. Curing light 9 is also irradiated onto the adhesive 6 from an upper direction of the base 1 to cure the adhesive 6. Although the adhesive 6, before setting, flows downstream by capillary action through the gap 10 between the guide pin 5 and the guide pin fixing groove 1a. However, since the capillary action is terminated at the thinned part 5a, the flow of the adhesive 6 is re-directed to the bottom of the fixing groove 1a. The adhesive 6 also flows into the bottom of the fixing groove 1a from the opening between the rear end of the guide pin 5 and the guide pin fixing groove 1a. If the adhesive 6 continues to flow along the bottom of the fixing groove 1a, it will overflow onto the end surface 1c of the base 1. To prevent it, the embodiment shown here is configured to irradiate the curing light 8 from the front end of the guide pin fixing groove 1a. The adhesive 6 having flown onto the bottom of the fixing groove 1a cures and dams up the flow.

Usable as the adhesive 6 in the present invention are photo-setting adhesives which cure with ultraviolet or visible-light irradiation. Photo-setting adhesives cured by ultraviolet rays involve, for example, epoxy adhesives, acrylic adhesives and silicone adhesive. Photo-setting adhesives cured by visible light involve, for example, acrylic adhesives. Light absorption characteristics of these adhesives can be adjusted in accordance with light absorption characteristics of a photo polymerizer mixed in the solvent medium.

According to the invention, even when the adhesive has a viscosity as low as approximately 50 P (poise), the guide pins can be fixed reliably while preventing the extrusion of the adhesive 6 at the end surface of the base 1.

Additionally, the invention attains omission of some steps of the manufacturing process, cost reduction and mass productivity of optical transmission modules by using thinned parts 5a easily made in the guide pins 5 to prevent the adhesive from extrusion.

Next explained is the second embodiment of the invention which is different from the first embodiment in nature of the adhesive, location for applying the adhesive and process for curing the adhesive.

Figure 8:
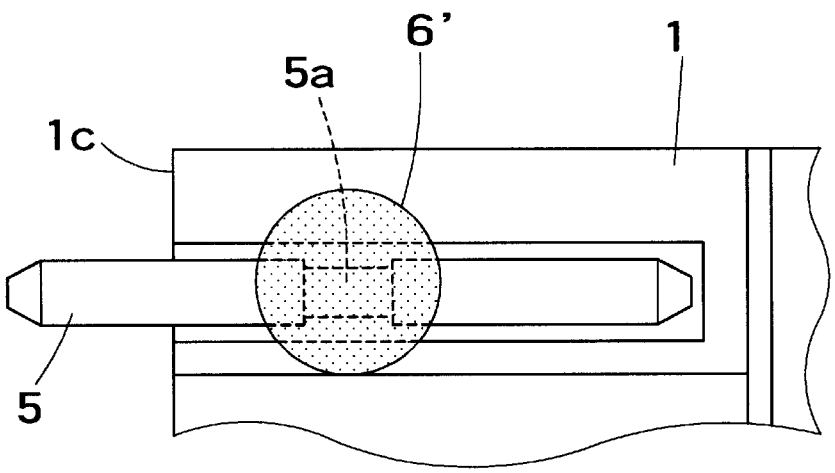
FIG. 8 is a fragmentary plan view of an optical transmission module according to the second embodiment of the invention.

FIG. 8 is a plan view of a central part of the base 1 of the optical transmission module according to the second embodiment. As shown in FIG. 8, in the embodiment shown here, guide pins 5 are put in the guide pin fixing grooves 1a on the base 1 and fixed on the base 1 by applying and curing the adhesive 6' to cover the thinned parts 5a of the guide pins 5 in an heaped-up configuration. The adhesive 6' used here preferably has a high viscosity. For example, an adhesive with a viscosity of 1000 P through 10000 P, approximately, can be more easily applied in an heaped-up configuration as shown in FIG. 8, and can be cured with substantially no flow in the gap between the guide pin 5 and the guide pin fixing groove 1a and on the bottom of the guide pin fixing groove 1a.

Additionally, since the guide pin 5 is fixed by applying and curing the adhesive 6' in the thinned part 5a, the second embodiment makes a structure where the adhesive 6' engages the thinned part 5a. That is, in the module according to the second embodiment, since the thinned part 5a is clamped by the adhesive 6', the guide pin 5 hardly drops away against a tensile stress along the lengthwise direction of the guide pin fixing groove 1a.

Also in the embodiment shown here, similarly to the first embodiment, the use of the thinned part 5a leads to a module with less heat conduction to the optical connector (not shown) and less optical misalignment.

Next explained is the third embodiment of the invention in which a pass-through part 5b is formed in addition to the thinned part 5a.

Figure 9:
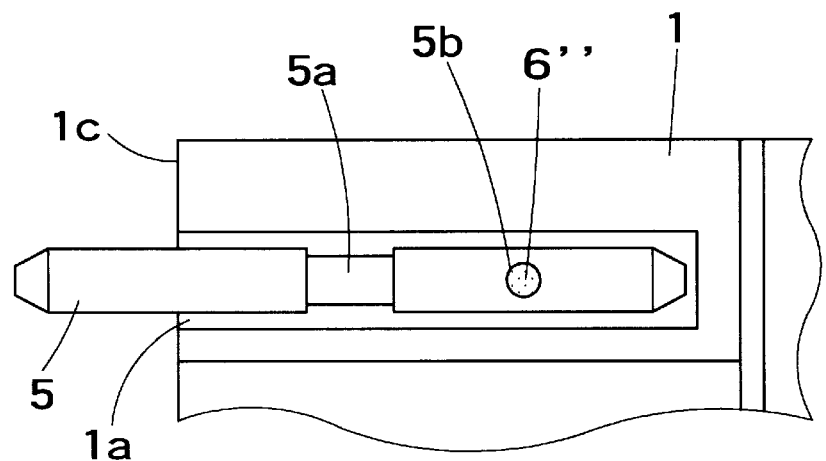
FIG. 9 is a fragmentary plan view of an optical transmission module according to the third embodiment of the invention.
Figure 10:
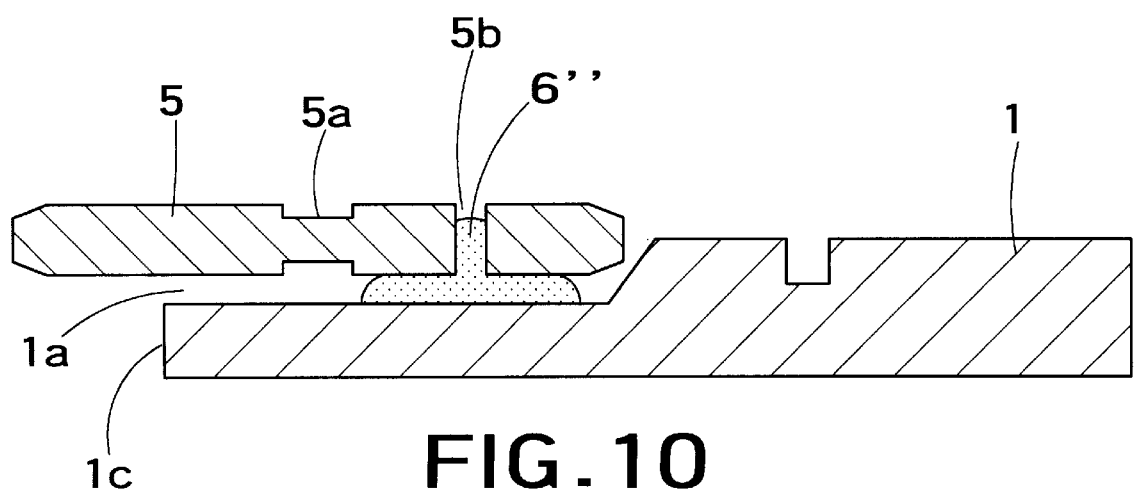
FIG. 10 is a cross-sectional view of the optical transmission module according to the third embodiment of the invention, illustrating the process of applying an adhesive.

FIG. 9 is a plan view of a central part of the base 1 of the module according to the third embodiment. FIG. 10 is a cross-sectional view of the same module under the process for applying an adhesive. When the guide pin 5 is made of a metal, it can be made easily and economically by lathing the portion for the thinned part 5a and by gouging a through hole with a diameter D". As shown in FIG. 10, in the embodiment shown here, the guide pin 5 is placed in the guide pin fixing groove 1a, and fixed on the base 1 by curing the adhesive 6" supplied under the guide pin 5 through the pass-through part 5a.

If the adhesive 6" is supplied through a supply nozzle inserted into the pass-through part 5a, dispersion of the adhesive around the supply nozzle can be restricted. Therefore, injecting conditions can be determined more easily, and the production yield in fixture of the guide pins can be improved by accurate control of the quantity of the injected adhesive. When the supply nozzle is inserted into the pass-through part 5a, the injection rate can be increased to reduce the time required for applying the adhesive. It results in improving the productivity and in reducing the manufacturing cost. In the optical transmission module shown here, since the guide pins is fixed by the adhesive 6" which cures with a part extending through the pass-through part 5a continuously from the part under the guide pin 5, the passthrough part 5a and the adhesive 6" engage with each other. That is, in the optical transmission module shown here, the passthrough part 5a is clamped by the adhesive 6" and the guide pin 5 unlikely drops away against a tensile force along the lengthwise direction of the guide pin fixing groove 1a. Additionally, by irradiating curing light from above the pass-through part 5a, the adhesive under the guide pin 5 can be cured quickly, if the adhesive is of the photosensitive type.

Moreover, in the embodiment shown here, the guide pin 5 having formed the pass-through part 5b is more effective for reducing heat conduction from the optical transmission module to the optical connector (not shown) than a guide pin 5 having formed only the thinned part 5a. Therefore, optical misalignment caused by heat can be prevented more effectively. As a result, the increase in temperature of the optical connector can be restricted more, and optical misalignment caused by thermal strain can be overcome.

The first to third embodiments have been explained above by showing specific examples. The invention, however, is not limited to these specific examples. For example, the thinned part 5a made in the guide pin 5 may be changed in shape variously other than the shape shown above.

FIGS. 11A through 11F show various examples of the shape for the thinned part of the guide pin suitable for use in optical transmission modules according to the invention. That is, the cross-sectional shape of the thinned part is not limited to one having straight walls and parallel bottoms as shown in FIG. 11A, but may be any of the shape defined by forward-tapered walls and parallel bottoms as shown in FIG. 11B, the shape defined by only forward-tapered walls as shown in FIG. 11C, the shape defined by only arcuate lines as shown in FIG. 11D, the shape defined by opposite-tapered walls and parallel bottoms as shown in FIG. 11E, and the shape defined by curved walls and parallel bottoms as shown in FIG. 11F.

One of factors for determining the shape of the thinned part is the angle α at the corner. In order to effectively blocking the flow of the adhesive by capillary action, the angle α had better be smaller. From the viewpoint of the strength of the guide pin, the angle α has better be larger. To facilitate the manufacturing process, it is disadvantageous to make the angle α smaller than 90°. That is, when much importance is attached to preventing the flow of the adhesive and facilitating the fabrication, the angle α is preferably 90°, approximately.

In contrast, the diameter and the length of the thinned part may be determined appropriately, taking the strength of the material of the guide pin into account. The Inventor has found that the difference $(D-D_{min})$ between the diameter D of the guide pin and the diameter $D_{min}$ of the thinnest portion of the thinned part be not less than 0.03 mm in order to reliably blocking the flow of the adhesive by capillary action. A difference not less than 0.06 mm is more preferable to effectively stop the adhesive and to effectively restrict heat conduction.

On the other hand, the length of the thinned portion is preferably not less than 0.1 mm, and more preferably 0.2 mm to more effectively restrict heat conduction and stop the flow of the adhesive.

When taking the strength of the guide pin into account, the diameter $D_{min}$ of the thinned part is preferably not less than 0.5 D and more preferably not less than 0.8 D. The length thereof is preferably not larger than 0.3 Q and more preferably not larger than 0.2 Q relative to the entire length Q of the guide pin.

The shape of the pass-through part 5a formed in the guide pin 5 is not limited to the example shown above.

Figure 12A:
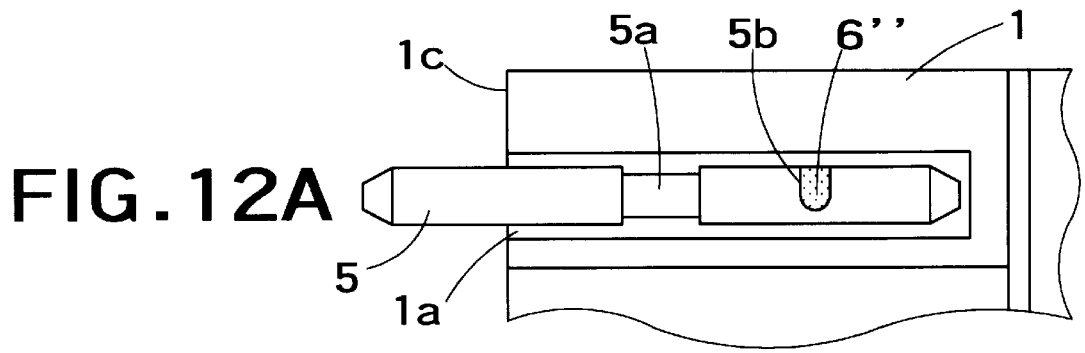
FIGS. 12A through 12D are views showing various examples of pass-through portions in the guide pins, other than the example shown in FIG. 9, which are suitable for use in optical transmission modules according to the invention.
Figure 12B:
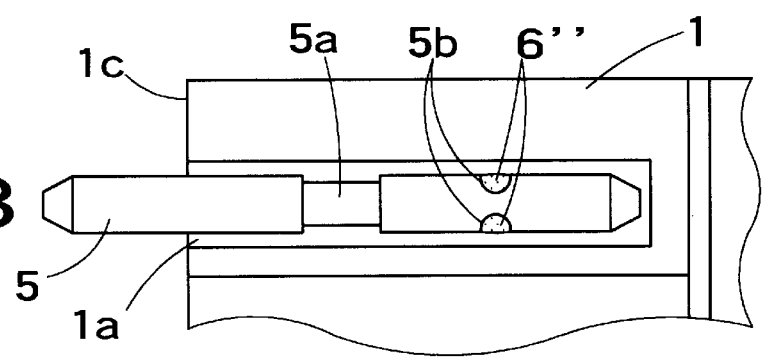
Figure 12C:
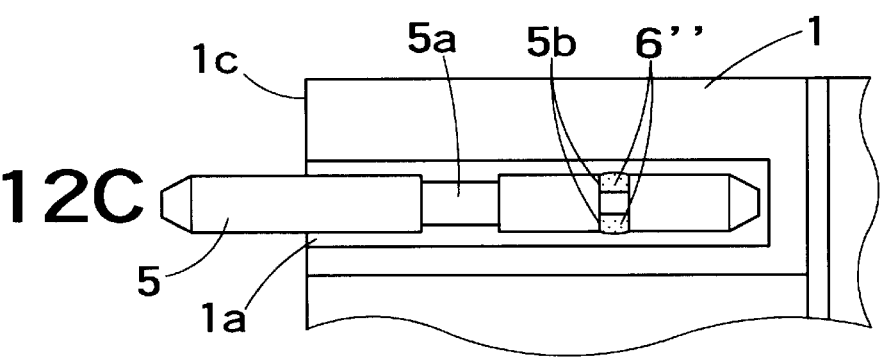
Figure 12D:
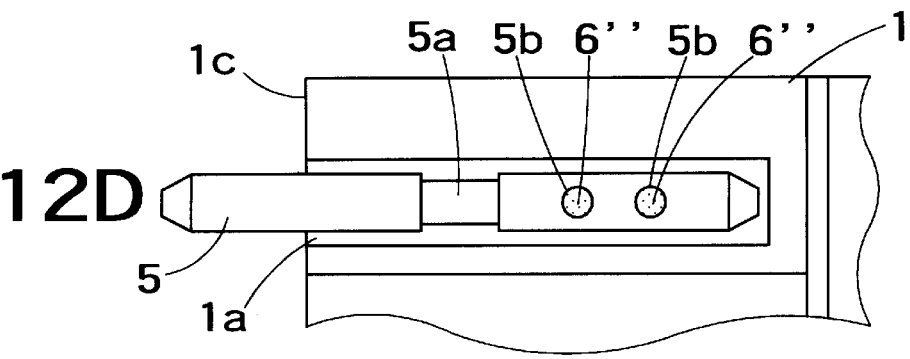

FIGS. 12A through 12D show various examples of the shape for the pass-through part of the guide pin other than one shown in FIG. 9, which are suitable for use in optical transmission modules according to the invention. The guide pin used in the invention may be one having formed the through hole as shown in FIG. 9, or any of one having formed a depression cut from one side as shown in FIG. 12A, one having formed two depressions cut from opposite directions as shown in FIG. 12B, one having formed a thinned portions as shown in FIG. 12C and one having formed two through holes as shown in FIG. 12D. The guide pin shown in FIG. 12C can be made most economically because the thinned passthrough part 5b can be formed in the common process with the thinned part 5a. The guide pin shown in FIG. 12D, having two through holes, is advantageous to apply the adhesive below the guide pin under a better control over a wider area. It also contributes to more restriction of heat conduction through the guide pin to more effectively prevent the optical connecter from being heated. Additionally, by applying the adhesive also within the through holes, the guide pin is clamped by the adhesive 6" at two locations, and more reliably prevented from dropping even upon a tensile force being applied in the lengthwise direction of the guide pin fixing groove 1a.

Next explained is the fourth embodiment of the invention partly enlarging the diameter of the guide pin to increase the fixture strength.

Figure 13A:
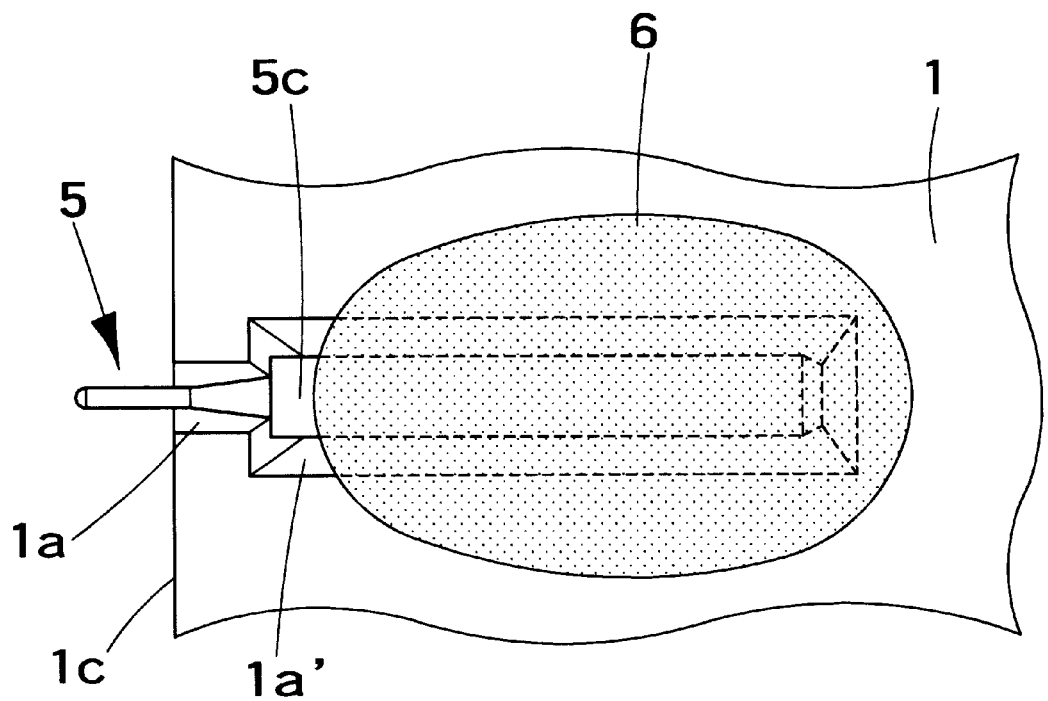
FIGS. 13A and 13B are fragmentary plan and cross-sectional views of an optical transmission module according to the fourth embodiment of the invention.
Figure 13B:
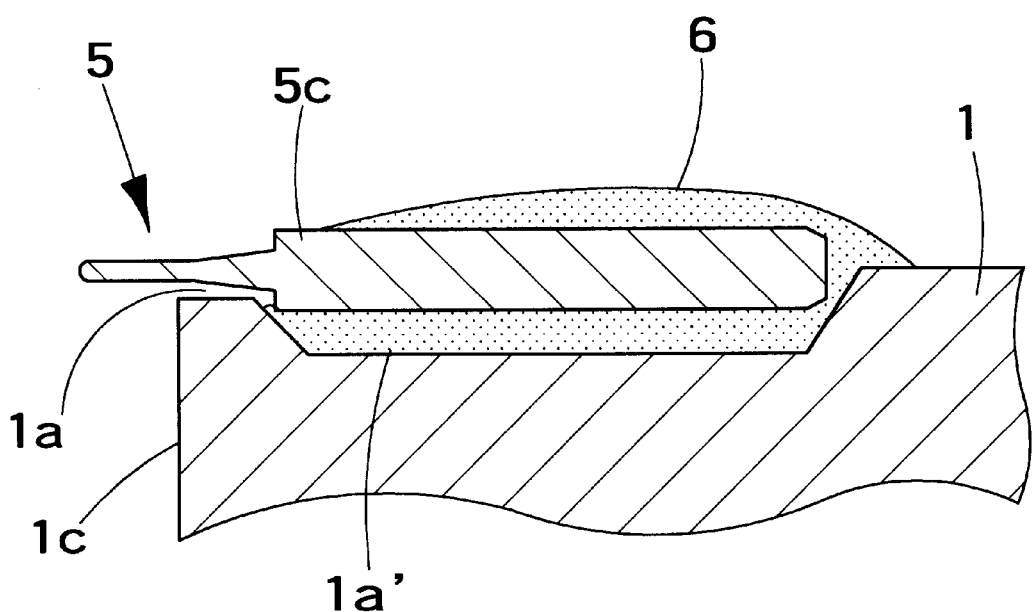
Figure 14:
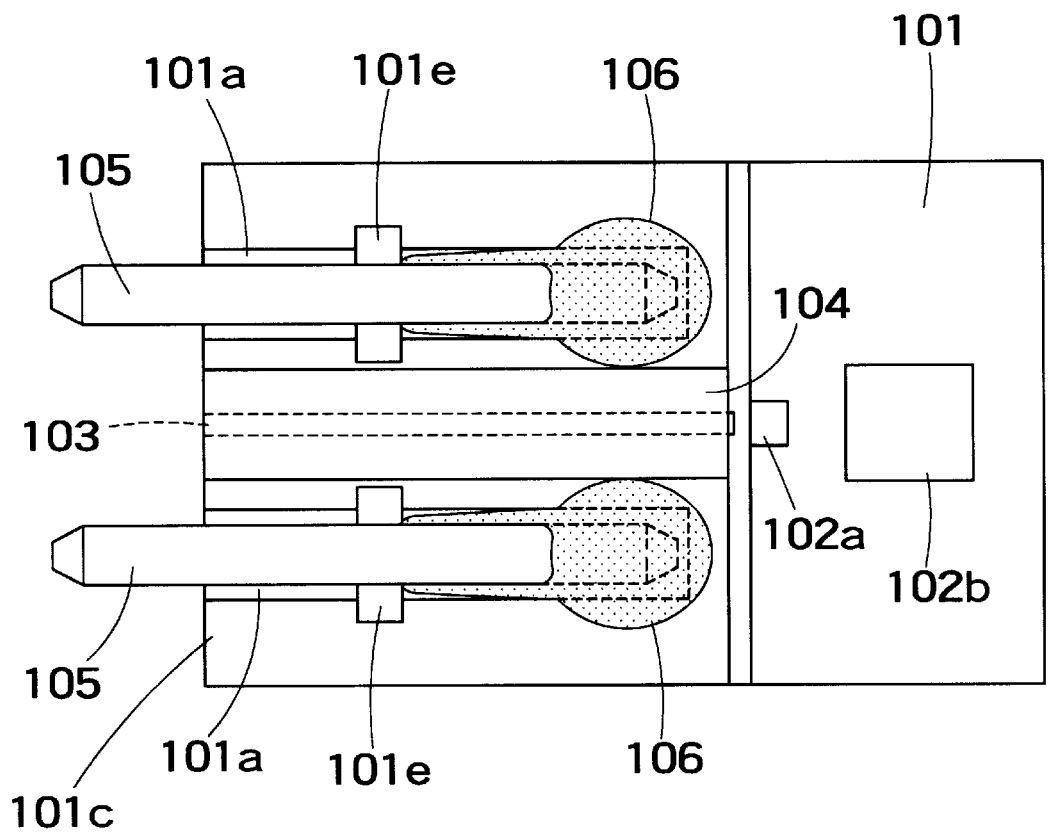
FIG. 14 is a plan view roughly showing the interior structure of a optical transmission module made by the Inventor on an experimental basis in the process to accomplishment of the present invention.

FIGS. 13A and 13B show a central part of the base 1 in the optical transmission module according to the third embodiment. FIG. 13A is a plan view, and FIG. 13B is a cross-sectional view. In the embodiment shown here, the rear half of the guide pin 5 to be fixed to the base 1 is enlarged in diameter as shown at 5c. The fixing groove 1a made in the base 1 is partly deeper as shown at 1a' in accordance with the thicker part 5c of the guide pin 5. The adhesive 6 is supplied to cover the thicker part 5c and fixes the guide pin 5 more strongly when it is cured.

In the embodiment shown here, since the guide pin 5 includes the thinner end to be coupled to the optical connector (not shown) and the thicker rear part 5c, and the fixing groove 1a formed in the base 1 includes two portions different in depth, the adhesive 6 hardly extrudes at the end surface 1c of the base, and the strength of the guide pin against a tensile force is increased so much. That is, the guide pin hardly drop away, and the reliability of the optical transmission module is improved remarkably. Additionally, when the length of the thicker part 5c of the guide pin 5 is optimized, the adhesive 6 can be applied to the extent nearest to the end surface of the base and under the guide pin over a longer area to improve the fixture strength of the guide pin.

Moreover, the thicker part of the guide pin 5 increases the strength of the guide pin itself. Therefore, the guide pin seldom deviates in position also when the optical connecter is inserted, and the module maintains optical coupling with a high efficiency.

Although the rear half of the guide pin 5 shown in FIGS. 13A and 13B has a uniform thickness over the entire length thereof, the invention is not limited to it. That is, the guide pin may be made thicker only at a more limited part thereof. For example, only a central part of the guide pin may be made thicker than opposite end portions thereof. In this case, also the fixing groove in the base is made deeper only at the location for receiving the thicker part of the guide pin. The cross-sectional shape of the thicker part is not limited to a circle, but may be selected from various shapes including polygonal and elliptic shapes.

Features of the fourth embodiment may be combined with the first to third embodiments. For example, a thinned part 5a as shown in FIG. 1 and FIGS. 11A through 11F may be made in the guide pin 5 shown in one of FIGS. 13A and 13B. For example, if a thinned part is formed between the thinner end and the thicker half of the guide pin 5, then the heat conduction can be reduced effectively as explained above. If a thinned part is additionally made at a location in contact with side walls of the groove, then the extrusion of the adhesive can be prevented.

Furthermore, a pass-through part 5b as shown in FIG. 9 or one of FIGS. 12A thorugh 12D may be additionally made in the guide pin 5 to more effectively restrict heat conduction and to more strongly fix the guide pin as explained above.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical transmission module comprising:

a base;

an optical semiconductor element formed on said base;

an optical fiber provided on said base and having one end optically coupled to said optical semiconductor element and the other end extending toward an end of said base; and a guide pin placed in parallel with said optical fiber and being brought into engagement with a recess formed in an optical connector, said base having a fixing groove for receiving a part of said guide pin on its inner wall, said guide pin having formed at least one thinned part, a distance between said guide pin and said inner wall of said fixing groove being larger at said thinned part.

2. The optical transmission module according to claim 1 further comprising an adhesive fixing said guide pin onto said base, said adhesive being applied to a selective part of said guide pin on one side of said thinned part nearer to said optical semiconductor element.

3. The optical transmission module according to claim 2 wherein said guide pin has formed at least one pass-through part in a selective portion thereof on one side of said thinned part nearer to said optical semiconductor element.

4. The optical transmission module according to claim 3 wherein said adhesive fills said pass-through part.

5. The optical transmission module according to claim 1 wherein said fixing groove has sloping walls so that the width at the top of said groove is broader than the width at the bottom of said groove.

6. The optical transmission module according to claim 5 wherein said base is made of silicon having a major surface parallel with (100) plane, and said inner wall of said fixing groove is parallel with {111} plane.

7. The optical transmission module according to claim 1 wherein a diameter of said thinned part of said guide pin is not less than 0.5 times a diameter of the remainder part of said guide pin.

8. The optical transmission module according to claim 1 wherein a length of said thinned part of said guide pin is not larger than 0.3 times a entire length of said guide pin.

9. The optical transmission module according to claim 1 further comprising an adhesive fixing said guide pin onto said base, said adhesive being applied to said thinned part of said guide pin.

10. An optical transmission module comprising:
a base;
an optical semiconductor element formed on said base;
an optical fiber provided on said base and having one end optically coupled to said optical semiconductor element and the other end extending toward an end of said base; and
a pair of guide pins placed in parallel at opposite sides of said optical fiber and being brought into engagement with recesses formed in an optical connector,
said base having a pair of fixing grooves each for receiving a part of each said guide pin,
each said fixing groove having opposite side walls which make an inner angle θ not smaller than 40° and not larger than 100°, having a width W along the surface of said base which is larger than D·cos(θ/2), and having a depth X from the surface of said base to the bottom of said fixing groove which is larger than (W/2)·cot(θ/2)+ (D/2)·(1−1/sin(θ/2)),
each said guide pin having formed at least one thinned part.

11. The optical transmission module according to claim 10 further comprising an adhesive fixing each said guide pin onto said base, said adhesive being applied to a selective part of each said guide pin on one side of said thinned part nearer to said optical semiconductor element.

12. The optical transmission module according to claim 11 wherein each said guide pin has formed at least one pass-through part in a selective portion thereof on one side of said thinned part nearer to said optical semiconductor element.

13. The optical transmission module according to claim 12 wherein said adhesive fills said pass-through part.

14. The optical transmission module according to claim 10 wherein each said fixing groove has sloping walls so that the width at the top of said groove is broader than the width at the bottom of said groove.

15. The optical transmission module according to claim 14 wherein said base is made of silicon having a major surface parallel with (100) plane, and said inner wall is parallel with {111} plane.

16. The optical transmission module according to claim 10 wherein a diameter of said thinned part of each said guide pin is not less than 0.5 times a diameter of the remainder part of each said guide pin.

17. The optical transmission module according to claim 10 wherein a length of said thinned part of each said guide pin is not larger than 0.3 times a entire length of each said guide pin.

18. The optical transmission module according to claim 10 further comprising an adhesive fixing each said guide pin onto said base, said adhesive being applied to said thinned part of each said guide pin.

19. A method for manufacturing an optical transmission module including a base having a pair of fixing grooves; an optical semiconductor element formed on said base; an optical fiber provided on said base and having one end optically coupled to said optical semiconductor element and the other end extending toward an end of said base; and a pair of guide pins placed in parallel at opposite sides of said optical fiber, each said guide pin having at least one thinned part, each said guide pin being brought into engagement with a recess formed in an optical connector, comprising the steps of:
placing each said guide pin in each said fixing groove of said base together with a photo-setting adhesive; and
irradiating light for curing said adhesive in a direction substantially parallel to said fixing grooves from one end of said base where one end of said fixing groove is exposed, and curing part of said adhesive which flows to bottoms of said fixing grooves.

20. A method for manufacturing an optical transmission module including a base having a pair of fixing grooves; an optical semiconductor element formed on said base; an optical fiber provided on said base and having one end optically coupled to said optical semiconductor element and the other end extending toward an end of said base; and a pair of guide pins placed in parallel at opposite sides of said optical fiber, each said guide pin having at least one thinned part and at least one pass-through part at a portion thereof on one side of said thinned part nearer to said optical semiconductor element, each said guide pin being brought into engagement with a recess formed in an optical connector, comprising the steps of:
placing each said guide pin in each said fixing groove of said base;
supplying an adhesive from said pass-through parts into gaps between said guide pins and said fixing grooves; and
curing said adhesive.

* * * * *